Patented Oct. 19, 1943

2,332,165

UNITED STATES PATENT OFFICE 2,332,165

TERPENE DERIVATIVE

Emil Ott, Elsmere, Del., assignor to Hercules Powder Company, Wilmington, Del., a corporation of Delaware No Drawing. Application December 31, 1940, Serial No. 372,487

17 Claims. (Cl. 260—79)

This invention relates to new terpene compounds and to a method for their preparation. More particularly, it relates to new terpene sulfur compounds and to a method for their preparation.

It is an object of this invention to provide new compounds suitable as resins and plasticizers. It is a further object to provide new resinous and plasticizing materials for sulfur and for sulfur-containing plastics. It is a still further object to provide resinous and plasticizing compounds for formulation in polysulfide plastics. It is a still further object to provide a method of preparing terpene polysulfides. Other and further objects will be found hereinafter.

These objects are attained in accordance with this invention by reacting a sulfur halide such as sulfur monochloride with a compound of the type formula $T(S_x-M)_y$ in which T is a terpenic radical; in which S is sulfur, in which $x$ is a small whole number, usually one; in which $y$ is a small whole number, usually one or two; and in which M is hydrogen, a metal, an ammonium radical, or a substituted ammonium radical. The product obtained by this reaction is a viscous or resinous terpene polysulfide containing two or more terpene radicals represented by the symbol T in the formula of the terpene mercaptan, mercaptide, or the like used as reactant.

The terpenic reactant represented by the formula $T(S_x-M)_y$ may be a derivative of any terpene radical. It may be, for example, a mercaptan (hydrosulfide or hydropolysulfide) in which the radical M is hydrogen, or it may be a mercaptide of similar nature in which the radical M is a metal or ammoniacal radical similar in reactive nature to the metals. Thus, the method in accordance with this invention may comprise reacting a terpene compound which is unsaturated in nature or capable of rearrangement to an unsaturated form with hydrogen sulfide or with hydrogen polysulfide to form a terpene mercaptan, followed by reaction of the resulting compound with sulfur monochloride or other sulfur halide. The mercaptan may be converted to a mercaptide prior to treatment with the sulfur halide by treatment with a metal or ammonium hydroxide or a salt reactable with mercaptans. The radical T may be a radical of a terpene hydrocarbon such as alpha-pinene, beta-pinene, dipentene, terpinene, terpinolene, allo-ocimene, fenchene, bornylene, and the like; or it may be a radical of a terpene monohydric alcohol, such as, fenchyl alcohol, terpineol, borneol, isoborneol; or a terpene polyhydric alcohol such as sobrerol, terpin, pinolglycol, and the like; or it may be a radical of a terpene ether such as the methyl, ethyl, isopropyl, butyl, amyl, glycol, glycerol, etc., ether of terpineol, borneol, isoborneol, fenchyl alcohol, and the like; or it may be a radical of a terpene ester such as terpinyl acetate, fenchyl acetate, bornyl acetate, etc. It will be understood that substituent groups of the terpene hydrocarbon represented by the various alcohols, ethers, and esters mentioned may remain in the terpenic sulfur compound used as reactant and also in the final reaction product. Thus, the symbol T represents terpene radicals generally and is not limited to radicals of terpene hydrocarbons, as it includes radicals of substituted terpene compounds. The terpene mercaptan, mercaptide, etc. may be derived from a pure terpene compound or from a crude terpene cut such as wood or gum turpentine, pine oil, and the like.

The symbol M in the formula hereinabove mentioned may be hydrogen, the ammonium radical, or a radical of a substituted ammonium such as, for example, the trimethyl benzyl ammonium radical, the tribenzyl methyl ammonium radical, etc. The symbol M may also stand for a metal such as sodium, lithium, potassium, calcium, lead, mercury, magnesium, nickel, copper, iron, silver, etc. Most suitable metals have been found to be the alkali metals and metals capable of forming insoluble chlorides.

It will be appreciated that the radical M may be monovalent or polyvalent. In the case of polyvalent metals, more than one terpenic group may be linked thereto through sulfur bondage. It will also be appreciated that the terpenic radical T may be polyvalent with respect to the mercaptan or mercaptide groups attached thereto, the symbol $y$ being greater than one. Thus, more than one sulfur atom may be linked to the terpenic radical. For example, where a terpene compound having more than one point of unsaturation is treated with a mercaptan or mercaptide or with hydrogen sulfide, dimercaptans, dimercaptides, and the like may result. Such compounds form particularly suitable reactants, as they produce chain-type polymers of high melting point and high molecular weight.

The sulfur halide utilized will preferably have a high sulfur content. Thus, the sulfur monohalides, particularly sulfur monochloride and sulfur monobromide are greatly preferred, and the process of this invention will be described hereinafter on the basis of the use of sulfur monochloride. However, halides such as, for example, sulfur dichloride, sulfur dibromide, sulfur tetrachloride, sulfur chloroiodide, sulfur iodide, sulfur monofluoride, sulfur tetrafluoride, etc., may be used, if desired, in quantities equivalent in reaction to sulfur monochloride.

The terpenic sulfur compound may be reacted with the sulfur halide in a solvent reaction medium which is substantially inert to the reactants under the conditions employed. Suitable reaction medium solvents are, for example, aromatic hydrocarbons such as benzene, toluene, xylene, and the like; aliphatic hydrocarbons such as pentane, hexane, heptane, octane, and the like; ethers such as dimethyl ether, diethyl ether, methyl ethyl ether, di-isopropyl ether, and the like; chlorinated hydrocarbon solvents such as carbon tetrachloride, ethylene dichloride, chloroform, methylene chloride, and the like. The aromatic hydrocarbons are in general most suitable. Conveniently, each of the two reactants is dissolved or suspended in a reaction medium solvent prior to mixing together to initiate the reaction. For example, it is usually desirable to utilize a solution of sulfur monochloride in about 5 or more times of its weight of the reaction medium solvent.

Sulfur monochloride will be utilized in a quantity equivalent to about one mol or a quantity in excess of about one mol (calculated on the basis of one sulfur atom per mol) per mol of mercaptan or mercaptide and the like reacted upon. Thus, a terpene mercaptan requires at least 40% by weight of sulfur monochloride for complete reaction and a terpene mercaptide an equivalent quantity depending on the particular mercaptide. An excess of sulfur monochloride is preferred. The reaction between the sulfur monochloride and the terpenic mercaptan or similar sulfur compound may be carried out at any temperature between about 0° C. and about 200° C. or up to the reflux temperature of the reaction mixture. Temperatures higher than the reflux temperature call for the use of an autoclave or other confining vessel. The preferred range of operation is between about 20° C. and about 60° C. The reaction may be continued for a time between about 0.5 and about 24 hours. However, in most cases, a substantially complete reaction is obtained within 1 to 2 hours.

The viscous or resinous terpene polysulfide may be recovered from the reaction mixture by first washing with water or a dilute aqueous solution of an alkali such as sodium hydroxide, sodium carbonate, potassium hydroxide, potassium carbonate, etc. until the water-immiscible reaction mixture is free of acid and salt. Insoluble matter may be removed by filtration or decantation. The terpene polysulfide is insoluble in water and will in most cases be dissolved in a reaction solvent medium which is also insoluble in water, thereby facilitating the washing operation. Volatile solvents may then be removed by evaporation under reduced pressure or by steam distillation. It will be appreciated that volatile solvents may be left with the terpene polysulfide products where it is desired to use the material in a solution of this nature.

The reaction mechanism of the process of this invention may be explained with reference to a terpene mercaptan or mercaptide and sulfur monochloride as reactants. It is believed the atom represented hereinbefore as M (hydrogen, a metal, etc.) splits out by reaction with a chlorine atom to form hydrogen chloride, a chloride salt, etc., and is replaced by the remainder of the sulfur monochloride molecule. A second terpene mercaptan or mercaptide molecule is then believed to be similarly reacted to form a compound with at least two terpenic radicals connected by a chain of sulfur atoms. The characteristic viscosity or resinous form of the products is ascribed to the chain of sulfur atoms in the linkage.

The terpene polysulfide obtained by this method varies from a more or less viscous liquid nature to a resinous solid of relatively high melting point which may be well in excess of 100° C. by the drop melting point method. The exact nature of the product depends upon the terpene mercaptan, mercaptide, etc. utilized and upon the purity of the material utilized. Substantially pure mercaptans, particularly those readily reactive with sodium hydroxide solution to form mercaptides soluble therein, yield hard, high melting polysulfide resins. Crude mercaptans, especially those rich in mercaptans not readily extracted by aqueous sodium hydroxide solutions lead to formation of viscous liquid or semi-solid products. Thus, a solid product is obtained by utilizing mercaptans or mercaptides obtained by extracting a crude terpene mercaptan with aqueous caustic alkali. The nature of the product is also influenced by the number of mercaptan or mercaptide groups on the terpenic radical of the reactant. Thus, dimercaptans and dimercaptides form harder products, i. e. longer chain products, than the mono derivatives.

The color of the liquid or resinous terpene polysulfide varies from dark to very light amber, depending upon the purity of the compound reacted upon. Where the original terpene sulfur compound consists of a pure compound and is light in color, the reaction product will usually be light in color. However, relatively low temperatures of reaction are desirable for lightest colors, and in addition the reaction may be conducted under a blanket of carbon dioxide to promote formation of light colored products.

The products of the present invention are characterized by a viscosity ranging from at least about 200 cp. at 25° C. for relatively fluid bodies to that of solid bodies harder than rosin. The sulfur content may vary from about 28% to about 50% and will usually be from about 30% to about 45%. The products are distinguished from mixtures containing large proportions of free sulfur since the sulfur content is substantially completely in chemical combination.

The products herein described are linear polysulfides, the term "linear" being used to indicate chain linkage of the sulfur atoms as distinguished from isolated sulfur atoms. These products are to be distinguished from polysulfides of the type in which a terpene radical contains several sulfur atoms directly linked to the terpene carbon atoms, for example, as in the case of a polymercaptan. Such compounds are very nearly as fluid as the terpenes from which they are derived and are not highly viscous or resinous. In addition, such compounds usually react to a considerable extent with metal salts and hydroxide, especially with aqueous caustic alkalis, to form mercaptides and the like. The products of the present invention are substantially non-acid in nature; i. e. they are substantially unreactive with cold aqueous caustic alkalis (i. e. sodium hydroxide) of 5–10% strength to form water-soluble sodium derivatives.

The viscous and resinous polysulfides are chain-like compounds in which at least two terpenic radicals are linked by a linear chain of sulfur atoms, the chain containing three or more sulfur atoms. This structure is represented diagrammatically by:

$$T-S_z-T-$$

in which the unit $-S_z-T$ may be repeated a variable number of times, in which $z$ is a whole number more than 2 and usually averaging near 4, and in which T is a terpenic radical. A simple linear polysulfide may have two terpenic radicals and may, for example, have the formula, $$T-S-S-S-S-T$$

The general formula of these compounds is $$T-(S_z-T)_n$$

where $n$ is an integer, one or more, increasing with increase in hardness of the material.

The mercaptans, mercaptides and the like utilized for the preparation of the polysulfides in accordance with this invention may be prepared from unsaturated terpene compounds of the type hereinbefore mentioned. Mercaptans may, for example, be prepared by reacting an unsaturated terpene compound with hydrogen sulfide, for example, at a temperature from 0 to 100° C. at atmospheric pressure, or if desired at an elevated pressure up to say 100 atmospheres, preferably in the presence of a small amount of acidic catalyst, such as sulfuric acid, phosphoric acid, etc. Mercaptides may be prepared by reacting the mercaptan so prepared with a metal base such as sodium hydroxide, potassium hydroxide, and the like or by ammonium hydroxide or a substituted ammonium hydroxide, or by a compound of a metal capable of forming more or less insoluble mercaptides; for example, lead acetate, copper acetate, nickel acetate, iron sulfate, silver nitrate, and the like. The mercaptans, mercaptides and the like utilized for reaction with sulphur monochloride in accordance with the method of this invention will be characterized by a sulfur content less than about 28%, usually from about 5% to about 20%.

The following examples are given in illustration of the method of this invention and represent specific embodiments thereof. All parts and percentages are by weight unless otherwise specified.

*Example I*

Sodium pinene mercaptide was prepared by mixing 9 parts of sodium hydroxide dissolved in 79 parts of 95% ethyl alcohol with 40 parts of pinene mercaptan, allowing the mixture to stand at room temperature for several hours, and then removing the alcohol and most of the water by heating at a reduced pressure to leave a grayish-white solid. The solid sodium pinene mercaptide so formed was suspended in 89 parts of benzene. A solution consisting of 25 parts of sulfur monochloride in 89 parts of benzene was added slowly to the sodium pinene mercaptide suspension with constant shaking. An exothermic reaction took place. However, the temperature was held at below about 40° C. by external cooling. After all of the sulfur monochloride solution had been added, the mixture was permitted to stand for 24 hours at room temperature. It was then washed repeatedly with water until free of sodium chloride, HCl, and unreacted sulfur monochloride. The benzene present was then removed by heating under reduced pressure. In this manner a yield of 40 grams of a dark, viscous product analyzing 39.5% sulfur and 1% chlorine was obtained.

*Example II*

A solution consisting of 72 parts of sulfur monochloride dissolved in 350 parts of benzene was slowly added with stirring to a second solution consisting of 167 parts of crude pinene mercaptan containing 18% sulfur dissolved in 150 parts of benzene. The temperature of the mixture was kept at 50° C. or below by external cooling. The resulting reaction mixture was permitted to stand overnight. Hydrochloric acid present was then washed out of the reaction mixture with water and caustic soda solution. The resulting neutral solution was then steam distilled to remove the benzene and any volatile terpene compound present. The residue from the steam distillation was then taken up in a small quantity of ether and dried. The ether was evaporated, leaving 165 parts of dark, viscous pinene polysulfide. This material had a sulfur content of 33.5%.

*Example III*

Crude pinene mercaptan prepared by reacting wood turpentine with hydrogen sulfide was treated with 15% caustic soda to obtain the caustic extractable portion thereof. The material extracted was converted to mercaptan and freed from any mercaptide by acidifying it with acetic acid. In this manner, a reactant consisting essentially of pure pinene mercaptan was obtained. Twenty grams of this mercaptan were dissolved in 50 parts of benzene. To this solution was slowly added a solution consisting of 10 parts of sulfur monochloride dissolved in 100 parts of benzene. The resulting solution was permitted to stand overnight and was then water washed, washed with aqueous caustic, water washed, and volatile solvents removed by steam distillation. In this manner 20 parts of a pale yellow solid analyzing 40.7% sulfur were recovered. The material was resinous in nature and had a drop melting point of 105° C.

*Example IV*

Crude pinene mercaptan analyzing 14.9% sulfur was treated with a 15% aqueous caustic soda solution to remove caustic extractable material. The pinene compound remaining after the caustic extraction was acidified to remove any mercaptides present. This material may be referred to as neutral pinene mercaptans. It gives a positive doctor test for mercaptans, but does not form a sodium mercaptide readily. Two hundred eighty parts of the neutral mercaptans were dissolved in 270 parts of benzene. To this solution was slowly added a solution consisting of 113 parts of sulfur monochloride dissolved in 540 parts of benzene. The temperature of the reacting mixture was regulated by external cooling, and was held at about 40° C. The resulting mixture was then permitted to stand overnight at room temperature. Acid was removed by washing with 15% caustic soda solution followed by water washing. Benzene was removed by steam distillation. In this manner 270 parts of pinene polysulfide in the form of a dark brown viscous liquid analyzing 34.7% sulfur were obtained.

*Example V*

The pure pinene mercaptan prepared by extracting the crude pinene mercaptan used in Example IV with caustic solution and then recovering pure pinene mercaptan from the caustic extract by acidification with acetic acid was utilized in this example. Fifty-two parts of this pure mercaptan were dissolved in 125 parts of benzene, and to this solution was slowly added a solution of 27 parts of sulfur monochloride in 225 parts of benzene. The reaction temperature was kept at about 40° C. The resulting reaction mixture was permitted to stand overnight and was then washed with water, aqueous sodium hydroxide, and then with water to remove all hydrochloric acid present. Benzene was removed by steam distillation. A solid product containing some water remained. It was then extracted with benzene, dried, and the benzene removed by vacuum distillation under reduced pressure. In this manner 72 grams of a pale colored resinous solid having practically no odor, analyzing 40.8% sulfur, and having a drop melting point of 80.5° C. were obtained.

*Example VI*

A solution consisting of 100 parts of allo-ocimene mercaptan having a sulfur content of 16.8% and 100 parts of benzene was treated with sulfur monochloride by adding a dropwise solution consisting of 40 parts of sulfur monochloride and 50 parts of benzene. The reaction vessel was cooled in ice water. The reaction mixture darkened, and considerable hydrogen chloride was evolved. At the completion of the reaction, the resulting mixture was washed free of acid with water. The clear benzene solution remaining was steam distilled to remove the benzene and the heavy, viscous liquid remaining was dissolved in about 160 parts of ether. Water present was separated. The ether solution was dried and evaporated on a steam bath. In this manner 180 parts of a dark, viscous polysulfide analyzing 28.6% sulfur and 2.6% chlorine were recovered. The polysulfide had a faint odor of allo-ocimene, but had no sulfur odor.

*Example VII*

One mol of sulfur monochloride dissolved in approximately 5 times its weight of benzene was added slowly with shaking to one mol of sodium dipentene mercaptide suspended in twice its weight of benzene. The temperature of the reaction mixture was held at below 50° C. After the reaction mixture had stood for several hours at room temperature, the benzene solution was washed with water to remove sodium chloride and unreacted sulfur monochloride. The product was recovered by evaporating the benzene at a reduced pressure.

The products in accordance with this invention are suitable as resinous and plasticizing components of plastics and coatings. They are of especial value in plasticizing sulfur and may be used therewith in a quantity up to about 75% to improve the toughness, impact resistance, coherence, and adherent properties of the sulfur. They also find use as resinous and plasticizing ingredients of plastic materials containing relatively large proportions of chemically bound sulfur, for example, the polyalkylene polysulfides in which they may be used in a quantity up to about 75% of the composition. The products may also be used in the formulation of rubber compositions in which they serve as a source of sulfur and to which they impart plasticizing properties when they are of a liquid nature, and increased adherence and stiffening properties when they are of a hard nature.

It will be understood that the details and examples hereinbefore set forth are illustrative only and that the invention as broadly described and claimed is in no way limited thereby.

What I claim and desire to protect by Letters Patent is:

1. A method for the preparation of a terpene polysulfide which comprises reacting a sulfur halide with a compound having the type formula $$T(S_x-M)_y$$

in which T is a terpenic radical, in which S is sulfur, in which $x$ and $y$ are small whole positive numbers, and in which M is a radical selected from the group consisting of hydrogen, the metals, the ammonium radical, and organic substituted ammonium radicals said M being adapted to react with the halogen group of said sulfur halide.

2. A method for the preparation of a terpene polysulfide which comprises reacting a sulfur monohalide with a compound having the type formula $T(S_x-M)_y$ in which T is a terpenic radical, in which S is sulfur, in which $x$ and $y$ are small whole positive numbers, and in which M is a radical of the group consisting of hydrogen, the metals, the ammonium radical, and organic substituted ammonium radicals said M being adapted to react with the monohalide group of said sulfur monohalide.

3. A method for the preparation of a terpene polysulfide which comprises reacting sulfur monochloride with a compound having the type formula $T(S_x-M)_y$ in which T is a terpenic radical, in which S is sulfur, in which $x$ and $y$ are small whole positive numbers, and in which M is a radical of the group consisting of hydrogen, the metals, the ammonium radical, and organic substituted ammonium radicals said M being adapted to react with the monochloride group of said sulfur monochloride.

4. A method for the preparation of a terpenic polysulfide which comprises reacting sulfur monochloride with a terpene mercaptan, and recovering the resulting polysulfide.

5. A method for the preparation of a terpenic polysulfide which comprises reacting sulfur monochloride with a terpene mercaptide, and recovering the resulting polysulfide.

6. A method for the preparation of a terpenic polysulfide which comprises reacting sulfur monochloride with a pinene mercaptan, and recovering the resulting pinene polysulfide from the reaction mixture.

7. A method for the preparation of a terpenic polysulfide which comprises reacting sulfur monochloride with a pinene mercaptide, and recovering the resulting pinene polysulfide from the reaction mixture.

8. A method for the preparation of a terpenic polysulfide which comprises reacting sulfur monochloride with a dipentene mercaptan, and recovering the resulting dipentene polysulfide from the reaction mixture.

9. A method for the preparation of a hard resinous terpene polysulfide which comprises recovering terpene mercaptans extractable by aqueous caustic alkali from a crude terpene mercaptan mixture, treating the extractable mercaptans with sulfur monochloride, and recovering a hard resinous terpene polysulfide from the resulting mixture.

10. A method for the preparation of a hard resinous terpene polysulfide which comprises recovering terpene mercaptans extractable by aqueous caustic alkali from a crude mercaptan mixture resulting from the reaction of turpentine with hydrogen sulfide, treating the extractable mercaptans with sulfur monochloride, and recovering a hard resinous terpene polysulfide from the resulting mixture.

11. A hard resinous terpenic linear polysulfide having a combined sulfur content between about 42% and about 50%.

12. A terpenic linear polysulfide which is a soft resin at ordinary room temperature and is characterized by a combined sulfur content between about 28% and about 35%.

13. A terpenic linear polysulfide which is a soft to hard resin at ordinary room temperature and is characterized by a combined sulfur content between about 28% and about 50%.

14. A pinene linear polysulfide which is in the range from a soft to a hard resin at ordinary room temperature and is characterized by a combined sulfur content between about 28% and about 50%.

15. A dipentene linear polysulfide which is in the range from a soft to a hard resin at ordinary room temperature and is characterized by a combined sulfur content between about 28% and about 50%.

16. A linear resinous polysulfide having the type formula $T-(S_z-T')_n$, in which T and T' are each an unsaturated terpenic radical, in which S is sulfur, in which $n$ is a positive integer the magnitude of which is dependent upon the original unsaturation of T, and $z$ is a positive integer greater than two.

17. A resinous polysulfide having the type formula $T-(S_z-T)$, in which T is a terpenic radical, in which S is a sulfur, in which $z$ is a positive integer greater than two, and in which the unit $(S_z-T)$ may be repeated a variable number of times.

EMIL OTT.

CERTIFICATE OF CORRECTION.

Patent No. 2,332,165. October 19, 1943.

EMIL OTT.

It is hereby certified that error appears in the printed specification of the above numbered patent requiring correction as follows: Page 4, second column, line 26, claim 2, and line 37, claim 3, strike out "of" first occurrence, and insert instead --selected from--; and that the said Letters Patent should be read with this correction therein that the same may conform to the record of the case in the Patent Office.

Signed and sealed this 7th day of December, A. D. 1943.

(Seal)

Henry Van Arsdale,
Acting Commissioner of Patents.